Patented Aug. 24, 1954

2,687,426

UNITED STATES PATENT OFFICE 2,687,426

PROCESS FOR THE MANUFACTURE OF A 1,2-DI-LOWER ALKYL-2-CARBOXY-7 ETHERIFIED HYDROXY-1,2,3,4,9,10-HEXAHYDROPHENANTHRENE

John A. Hogg, Kalamazoo, Mich., assignor to The Upjohn Company, Kalamazoo, Mich., a corporation of Michigan No Drawing. Application June 21, 1947, Serial No. 756,327

4 Claims. (Cl. 260—473)

1

The present invention relates to a novel process for the preparation of organic compounds, which are active estrogens in themselves, as well as valuable intermediates in the preparation of other estrogenic materials.

It is an object of the present invention to provide a novel process for the preparation of estrogenic compounds. Other objects of the invention will become apparent hereinafter.

The compounds prepared by the novel process of the present invention have the structural formula:

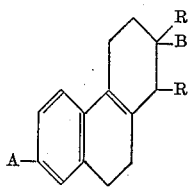

wherein A is selected from hydroxyl and a group convertible to hydroxyl with the aid of hydrolysis; wherein B is selected from carboxyl and an esterified carboxyl group convertible to carboxyl with the aid of hydrolysis; and wherein R is lower-alkyl.

In the above formula, A is thus hydroxyl or an ether group. Representative ether groups which may comprise A are methoxy, ethoxy, propoxy, butoxy, isopropoxy, benzyloxy, cyclohexoxy, and the like. The group represented by B in the above formula is selected from carboxyl and an esterified carboxyl group, of which the carbomethoxy, carbethoxy, carbopropoxy, and carbobenzoxy are representative.

The starting materials in the method are the meta-substituted phenethyl halides, e. g., the bromide having the formula:

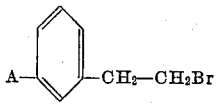

wherein A is an ether group.

The other starting reactant is an appropriately substituted beta-ketopimelate (Breslau, Baumgarten, and Hauser, J. Am. Chem. Soc. 66, 1286 (1944), having the formula:

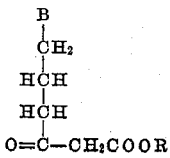

2 wherein R is the residue of a lower aliphatic or other suitable alcohol. The group represented by B in the above formula is an esterified carboxyl group which may be converted to carboxyl with the aid of hydrolysis according to the definition of the group B in the formula given above for the compounds of the present invention.

The beta-ketopimelate and the substituted phenethyl halide are condensed together, usually with a condensing agent such as an alkali metal alcoholate or amide, followed by cyclodehydration of the resulting ketone, preferably with concentrated sulfuric acid, and subsequent alkaline hydrolysis of the resulting dihydronaphthalene derivative to give an alkali metal salt of a dibasic acid having the following formula:

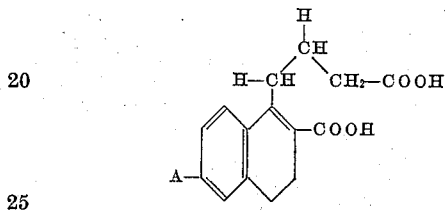

wherein A has the value given for the starting reactants. The diester may be isolated, as by dilution with ice and water, followed by extraction and removal of the extraction product, but further purification is accomplished usually only with some difficulty. The diester is therefore preferably saponified, without further purification, as by alcoholic alkali, to give the dibasic acid of the above formula. This acid, which is more easily purified than the ester, is then converted by reesterification, preferably with an alcohol in the presence of a catalyst which does not react with the aliphatic double bond, or without the presence of a catalyst, and subsequent cyclization with a sodium alcoholate (Dieckmann Reaction, Organic Synthesis, vol. I, p. 274, John Wiley and Sons, New York (1942) into the sodium salt of the unsaturated keto ester by the method of Bachmann, Kushner, and Stevenson, J. Am. Chem. Soc. 64, 977 (1942). The resulting 1-ketohexahydrophenanthrene compound, as the sodium salt, having the formula:

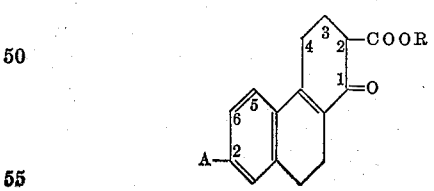

wherein A has the value given for the starting compounds, and wherein R is an alcohol residue, is then treated with an alkyl halide, preferably a methyl or ethyl halide, to introduce the angular alkyl group at the 2-carbon atom and give the 1-keto-2-carbalkoxy-2-alkyl - 1,2,3,4,9,10-hexahydro - 7 - hydroxyphenanthrene derivative, which is then treated with an alkyl magnesium halide, e. g., ethyl magnesium iodide, isopropyl magnesium bromide, or propyl magnesium chloride, to yield the 1-alkyl-1-hydroxy derivative, which is next dehydrated, as with concentrated sulfuric acid, to the alkylidene derivative, having the general formula given below:

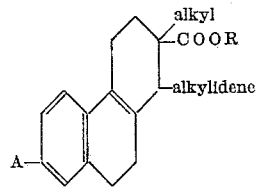

wherein A and R have the values given in the previous formula.

The alkyl magnesium halide and the unsaturated keto ester are reacted together in the presence of an anhydrous organic solvent such as ether, benzene, mixtures thereof, or the like, and usually in equimolar quantities. The temperature employed for the reaction may be anywhere between about zero degrees and about 70 degrees centigrade, preferably 30 to 50 degrees centigrade. The reaction is usually quite exothermic, takes place rapidly, and sometimes demands cooling control to prevent an undesirably rapid reaction rate. For this reason, the alkyl magnesium halide is preferably added portionwise to the keto ester at a rate which maintains the reaction at a rapid reflux. Agitation is preferably employed, and, after completion of the reaction, the intermediate precipitate, the magnesium halide salt of the tertiary alcohol, may be hydrolyzed, as with an excess of concentrated acid, the solvent removed, the residue triturated with a small amount of alcohol, and the crude product subsequently filtered therefrom.

The alkylidene derivative, having the above formula, may then be reduced, preferably catalytically, as with hydrogen and palladinized charcoal, palladium, Raney nickel, or like catalysts, until one equivalent of hydrogen has been absorbed. Palladinized charcoal is the preferred catalyst. The pressure employed should be between about atmospheric and 60 pounds per square inch, and the temperature between about 0 and 60 degrees centigrade, preferably 20–40 degrees centigrade. Catalyst may thereafter be removed and an alkaline hydrolysis employed to convert the ester to the free acid, the 1-alkyl-2-alkyl-2-carboxyl - 7 - substituted - 1,2,3,4,9,10-hexahydrophenanthrene.

This latter compound may then be converted by hydrogenation, preferably under the same conditions, to the 1-alkyl-2-alkyl-2-carboxyl-1,2,3,4,9,10,11,12 - octahydrophenanthrene compound, according to conventional hydrogenation procedure, with the employment of hydrogen and the same catalysts, such as palladinized charcoal, palladium, platinum oxide, or Raney nickel, with palladinized charcoal again being especially preferred.

As an alternative and preferred procedure, the compounds may be prepared starting from the beta-substituted phenethyl halides, preferably the bromide as used in the first procedure, and an appropriate 1-substituted 6-carbalkoxycyclohexene-1-one-3, of the formula:

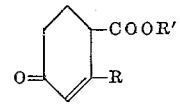

wherein R is alkyl, and wherein R' is an alcohol residue. The ester of 1-methyl - 6 - carbalkoxy-cyclohexene-1-one-3 is prepared by condensation of formaldehyde with an acetoacetic ester, followed by subsequent selective dehydration using sodium ethoxide. The esterifying group of the acetoacetic ester appears as R' on the carboxyl in such case, and this compound, wherein R is methyl, is known as Hagemann's ester (Berichte 26, 876 (1893)).

Variation of R may be accomplished according to the procedure of Mannich and Fourneau (Berichte 71, 2090 (1938)). This involves reaction of a ketone of the formula

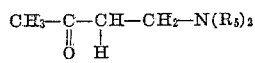

with a beta-keto ester of the formula

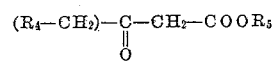

$R_4$ may be hydrogen, alkyl, alkoxy (RO—) or dialkoxy (RO—)$_2$, these variations appearing in the R of the Hagemann type ester. Thus, when $R_4$ is RO—(Organic Reactions, vol. I, p. 10), R becomes ROCH$_2$—. When the $R_4$ in the beta-keto ester reacted with the ketone is

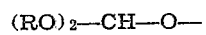

R in the Hagemann type ester becomes

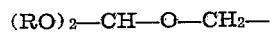

The Hagemann type ester bearing the desired substituents is reacted with the meta-substituted phenethyl halide, using an alkali metal amide or alkali metal alcoholate as condensing agent, with the amide being preferred. The beta-phenethyl halide condenses with the 2 position of the cyclohexenone ester to give a compound of the formula:

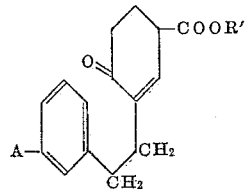

wherein A, R, and R' have the values given for the starting materials. The ketone is then reduced, preferably catalytically, to the corresponding compound containing a saturated cyclohexane ring. These compounds having the saturated ring, usually colorless oils having a fruity odor after removal of catalyst and solvent, ordinarily cyclize without further purification to a compound of the formula:

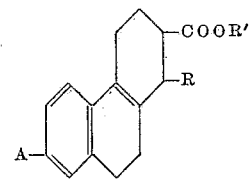

wherein A, R, and R' have the values previously given. This cyclization is accomplished with a dehydrating agent at a temperature sufficiently low to avoid decomposition of the reactants.

Concentrated sulfuric acid is a suitable agent for this purpose, but other dehydrating agents may be used if desired.

Upon pouring the dehydrocyclization product into water and ice, the above phenanthrene compound appears as a gum and may be extracted from the aqueous solution and isolated by removal of the solvent. Further purification is usually unnecessary, as, upon hydrolysis, preferably with an aqueous alcoholic alkali, the free acid is obtained in a solid state and is readily purified by crystallization. This acid (wherein R is methyl and A is methoxy, see Example 2) is an active estrogen in doses of 22.5 gammas by the Kahnt-Doisy method.

For some purposes, an ester of the acid is preferred, and esterification of the acid may be accomplished using an alcohol and a catalyst such as sulfuric acid or para-toluene-sulfonic acid; a dialkylsulfate, or diazomethane. The catalyst, however, should be such as does not add to the aliphatic-type double bond of the molecule. The resulting ester may be crystallized or distilled to yield a pure product. A lower-alkyl ester, such as methyl, ethyl, propyl, or isopropyl, is preferred, although others may be used with only somewhat less satisfactory results.

The introduction of an angular group at carbon atom 2 is accomplished by treating a metal derivative of the ester with an alkyl halide. The hydrogen on carbon atom 2 is capable of replacement by a metal, and triphenylmethyl sodium or other suitable metal alkyl may be used for such purpose. The metal complex may then be reacted with an alkyl halide to introduce an alkyl group on carbon atom 2, which is productive of a compound of the formula:

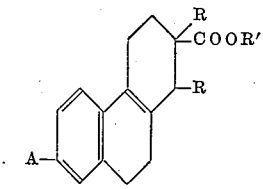

wherein A, R, and R' have the values previously given. This compound is identical with a compound produced by the first procedure, and may be isolated and purified, if desired, or may be hydrolyzed to give the free acid without extensive purification.

This acid is a mixture of two racemic compounds, which may be separated into two separate racemic forms. The higher-melting compound is conventionally designated trans, while the lower-melting compound is designated cis. According to the Kahnt-Doisy method of determination, the cis compound (wherein R is methyl and A is methoxy, see Example 5) is an active estrogen at a dosage of 5.1 gammas, while the corresponding trans compound is active both orally and subcutaneously at a dose level of 0.24 gamma.

This acid may then be reduced catalytically, preferably with hydrogen and a catalyst such as palladium, palladinized charcoal, platinum oxide, or the like, with palladinized charcoal being preferred, to yield the 1-alkyl-2-alkyl-2-carboxyl-7-substituted - 1,2,3,4,9,10,11,12 - octahydrophenanthrene in two racemic cis forms and two racemic trans forms, with respect to the configuration between the B and C rings.

The following examples are given to illustrate the practice of the present invention, but are in no way to be construed as limiting.

EXAMPLE 1

*1-methyl-2-(m-methoxy-phenethyl)-6-carbethoxy-cyclohexene-1-one-3*

Thirteen grams (0.563 mole) of sodium was added portionwise to 250 milliliters of liquid ammonia containing 0.2 gram of hydrated ferric nitrate, with cooling only when necessary to facilitate the speed of addition. The mixture was stirred until the blue color was replaced by gray, whereafter the resulting suspension was cooled in an alcohol-Dry Ice bath, and 102.5 grams (0.563 mole) of Hagemann's ester, 1-methyl-6-carbethoxycyclohexene-1-one-3, was added as rapidly as possible with the continued application of the cooling bath. The deep-red reaction mixture was stirred without cooling for twenty minutes, and was then cooled again while 300 milliliters of dry toluene and 50 milliliters of sodium-dried ether were added. The cooling bath was then removed and the mixture stirred two hours at room temperature until substantially all of the ammonia had escaped. The reaction vessel was then heated to boiling, at which point the sodio-derivative appeared as a yellow precipitate.

One hundred and twenty grams (0.563 mole) of m-methoxyphenethyl bromide was added and the suspension refluxed under a nitrogen atmosphere for 18 hours. The resulting mixture was washed with dilute hydrochloric acid and then with water. The toluene layer was dried over magnesium sulfate, and the toluene was removed under vacuum. After a small forerun, distillation of the residue yielded 102 grams (58 per cent) of the desired product boiling at 180–184 degrees centigrade at 0.3 millimeter of mercury pressure.

*Anal.* Calc. for $C_{19}H_{24}O_4$: C, 72.2; H, 7.58. Found: C, 71.6; H, 7.41.

EXAMPLE 2

*1-methyl-2-carboxy-7-methoxy-1,2,3,4,9,10-hexahydrophenanthrene*

Thirty-three grams (0.104 mole) of the product from Example 1 dissolved in 100 milliliters of 95 per cent ethanol was hydrogenated under 35 pounds pressure using 4 grams of palladinized charcoal as catalyst. The theoretical amount of hydrogen was absorbed in 45 minutes. After filtration and removal of solvent, there remained a water-white oil of fruity odor. This oil was cooled to about −20 degrees centigrade in an alcohol-Dry Ice bath, and 80 milliliters of concentrated sulfuric acid which had been similarly cooled was added thereto. The viscous contents of the flask were stirred as the temperature was allowed to rise slowly, with cooling from time to time maintaining the temperature always below about 10 degrees centigrade. After twenty minutes of shaking and stirring, the temperature was allowed to rise to 20 degrees centigrade, whereafter the mixture was poured onto a large excess of cracked ice. The total reaction time was 30 minutes. A light-colored gum, 1-methyl-2-carbethoxy - 7 - methoxy - 1,2,3,4,9,10 - hexahydrophenanthrene, separated and was extracted with ether.

The ether was removed and the residue hydrolyzed by refluxing for one hour in 200 milliliters of a 6 per cent solution of potassium hydroxide in 180 milliliters of 95 per cent ethanol and 20 milliliters of water. The alcohol was then removed under vacuum and diluted with water, the water solution washed with ether and acidified with concentrated hydrochloric acid. The free acid came out as an oil which quickly solidified. There was obtained 18.5 grams (65 per cent) of crude acid, melting at 174–178 degrees centigrade, and two recrystallizations from 95 per cent ethanol raised the melting point to 192–193 degrees centigrade. The overall yield of product was 14.2 grams or 50 per cent of the theoretical.

By the Kahnt-Doisy method, this compound produces the full estrus response in doses of 22.5 gammas.

Anal. Calc. for $C_{17}H_{20}O_3$: C, 75.0; H, 7.35. Found: C, 75.0; H, 7.25.

Demethylation with 48 per cent hydrobromic acid yielded an oil, 1-methyl-2-carboxy-7-hydroxy-1,2,3,4,9,10-hexahydrophenanthrene, which was estrogenically active in doses of 20 gammas.

EXAMPLE 3

*Methyl 1-methyl-7-methoxy-1,2,3,4,9,10-hexahydrophenanthrene-2-carboxylate*

A solution of 7.5 grams of the product from Example 2 was dissolved in ether and treated with an excess of ethereal diazomethane. The solvent was removed, and the residue recrystallized from 95 per cent ethanol to yield 7.3 grams (93 per cent) of methyl 1-methyl-7-methoxy-1,2,3,4,9,10 - hexahydrophenanthrene - 2 - carboxylate, which crystallized in plates melting at 107–108 degrees centigrade.

Anal. Calc. for $C_{18}H_{22}O_3$; C, 75.6; H, 7.68. Found: C, 75.6; H, 7.71.

EXAMPLE 4

*1,2-dimethyl-2-carboxy-7 - methoxy-1,2,3,4,9,10-hexahydrophenanthrene*

A solution of triphenylmethyl sodium was prepared in ether and titrated according to the directions of Renfrow and Hauser (Organic Syntheses, vol. XIX, p. 83, John Wiley and Sons, Inc., New York, N. Y., 1939).

An equivalent amount (0.0255 mole) of the triphenylmethyl sodium was then added to an ether solution of 7.3 grams (0.0255 mole) of the product from Example 3 dissolved in 300 milliliters of sodium-dried ether contained in a 500-milliliter glass-stoppered flask. All operations were carried out under an atmosphere of dry nitrogen.

The deep, wine-colored solution was allowed to stand at room temperature with occasional shaking for one hour, after which time the red color had faded to a light orange.

The addition of 25 milliliters of methyl iodide resulted in a reflux of the ether, and a copious precipitate of sodium iodide soon developed. After standing overnight, the ether was removed and the residue, 1,2 - dimethyl - 2 - carbomethoxy - 7 - methoxy - 1,2,3,4,9,11 - hexahydrophenanthrene, was refluxed 8 hours with 10 grams of potassium hydroxide dissolved in 10 milliliters of water and 200 milliliters of 95 per cent ethanol. The alcohol was removed under vacuum on the steam bath, and the residue diluted with water, the potassium salt being insoluble in water at ordinary room temperature. Filtration gave a mixture of triphenylmethane and the salt. Several washings with ether removed the triphenylmethane, leaving 7 grams of the white crystalline salt, representing a yield of 85 per cent in the form of the salt.

EXAMPLE 5

*Cis and trans 1,2-dimethyl-2-carboxy-7-methoxy-1,2,3,4,9,10-hexahydrophenanthrene*

The salt from Example 4 was dissolved in 250 milliliters of boiling water containing enough alcohol to effect solution. Acidification with hydrochloric acid while hot yielded nearly the theoretical amount of acid melting at 197–201 degrees centigrade (softens at 190 degrees centigrade). Recrystallization from 95 per cent ethanol yielded 5.8 grams (80 per cent) of needles in bundles melting at 206–207 degrees centigrade. This product is the dl trans form of the acid. This form showed estrogenic activity at 0.24 to 0.35 gamma when administered subcutaneously, and at 0.25 gamma when administered orally.

Anal. Calc. for $C_{18}H_{22}O_3$: C, 75.60; H, 7.68. Found: C, 75.33; H, 7.79.

The aqueous alkaline filtrate from Example 4 was acidified with hydrochloric acid to give 1.0 grams of a tacky solid, which was dissolved in 25 milliliters of 95 per cent ethanol. After standing for two days, 150 milligrams of prisms formed which melted at 171–173 degrees centigrade with previous softening at 167 degrees centigrade. Crystallization from the same solvent raised the melting point to 172–173 degrees centigrade. The product is the dl cis form of the acid. This form showed subcutaneous estrogenic activity at 5.0 gammas.

Anal. Calc. for $C_{18}H_{22}O_3$: C, 75.60; H, 7.68. Found: C, 75.61; H, 7.98.

EXAMPLE 6

*1-methyl-2-carboxy-7-methoxy-3,4,9,10-tetrahydrophenanthrene*

To 10 grams of product from Example 1, cooled in an Erlenmeyer flask to −20 degrees centigrade, was added 30 milliliters of concentrated sulfuric acid, also cooled to near its freezing point. The temperature was maintained at or below 10 degrees centigrade until the main reaction had ceased, and was then allowed to rise to 20 degrees centigrade as in Example 2. The contents of the flask were poured into a beaker of cracked ice, the resulting gum was extracted with ether, the ether removed, and the residue hydrolyzed in 100 milliliters of 10 per cent alcoholic potassium hydroxide. The solvent was removed in vacuum, the residue diluted with water, and, after one extraction with ether, the aqueous solution was acidified with dilute hydrochloric acid. Five grams (58.5 per cent) of a yellow product, which melted at 175–188 degrees centigrade with evolution of carbon dioxide, was obtained. The material was further purified by recrystallization from acetic acid with some loss due to decomposition. The pure product melts at 192–195 degrees centigrade (decomp.), and is soluble in 95 per cent ethanol with difficulty.

By the Kahnt-Doisy test, this compound, 1-methyl - 2 - carboxy - 7 - methoxy - 3,4,9,10-tetrahydrophenanthrene, is estrogenically active in doses of 56 gammas.

Anal. Calc. for $C_{17}H_{18}O_3$: C, 75.6; H, 6.67. Found: C, 75.6; H, 6.67.

The methyl ester, melting at 112–113 degrees centigrade, was obtained by treating the acid with ethereal diazomethane.

Anal. Calc. for $C_{18}H_{20}O_3$: C, 76.1; H, 7.05. Found: C, 75.3; H, 7.09.

EXAMPLE 7

*Methyl 1 - ethylidene - 2 - methyl - 7 - methoxy-1,2,3,4,9,10 - hexahydrophenanthryl - 2 - carboxylate*

Twelve and one-half grams (0.0416 mole) of 1 - keto - 2 - methyl - 2 - carbomethoxy - 7 - methoxy - 1,2,3,4,9,10 - hexahydrophenanthrene was dissolved in 200 milliliters of dry ether, and 50 milliliters of dry benzene containing 0.05 mole of ethylmagnesium bromide was added thereto at about room temperature. The reaction mixture was then stirred for a period of three to four minutes, during which time considerable heat was evolved. A yellow precipitate, methyl 1 - hydroxyl - 1 - ethyl - 2 - methyl - 7 - methoxy - 1,2,3,4,9,10 - hexahydrophenanthrene - 2- carboxylate, separated from the reaction mixture immediately, and this product was hydrolyzed with an excess of one part of concentrated hydrochloric acid and one part of water. The ether-benzene layer was then separated, dried, and the solvent removed, after which the residue solidified almost immdeiately. After trituration with a small amount of methanol and subsequent filtration of the product therefrom, nine grams of crude product, having a melting point between about 135 and 140 degrees centigrade, was obtained. Upon crystallization from methanol, eight grams of the pure methyl 1-ethylidene-2-methyl - 7 - methoxy - 1,2,3,4,9,10 - hexahydrophenanthryl-2-carboxylate, having a melting point of 145 to 147 degrees centigrade, was obtained.

Anal. Calc. for $C_{20}H_{24}O_3$: C, 76.8; H, 8.15. Found: C, 76.4; H, 8.22.

EXAMPLE 8

*1 - ethyl - 2 - methyl - 2 - carboxy - 7 - methoxy-1,2,3,4,9,10-hexahydrophenanthrene*

Eight grams (0.0255 mole) of the ethylidene derivative from Example 7 was placed in an Adams hydrogenation machine with 200 milliliters of methanol and 2 grams of palladinized charcoal catalyst. The pressure was adjusted to 40 pounds, the suspension slowly dissolving as one equivalent of hydrogen was absorbed. After removal of catalyst, 12 grams of potassium hydroxide, dissolved in a minimum quantity of water, was added to the methanol solution, whereafter the solution was refluxed on the steam bath for 20 hours.

The solvent was removed in a vacuum to leave a solid potassium salt of somewhat gelatinous character. Cold water was added, the salt filtered, and, after washing with a further quantity of cold water, the salt was dissolved in hot water containing enough alcohol to effect solution. Acidification gave an oil which solidified while still hot and melted at 140–155 degrees centigrade. This oil was dissolved in ethanol and chilled in a refrigerator. The first crop of crystals melted at 165–168 degrees centigrade, and, after recrystallization from the same solvent, there was obtained 0.7 gram of desired 1-ethyl-2-methyl - 2 - carboxy - 7 - methoxy-1,2,3,4,9,10-hexahydrophenanthrene in the form of chunky needles melting at 175–176 degrees centigrade.

Anal. Calc. for $C_{19}H_{24}O_3$: C, 76.0; H, 8.67. Found: C, 75.7; H, 7.92.

EXAMPLE 9

*Hydrogenation of 1-ethyl-2-methyl-2-carboxy-7-methoxy-1,2,3,4,9,10-hexahydrophenanthrene*

This hydrogenation was carried out at atmospheric pressure using 200 milligrams of the acid from Example 8 in 20 milliliters of methanol with 150 milligrams of palladinized charcoal catalyst, the theoretical amount of hydrogen being absorbed. After filtration and removal of the solvent, there remained a white tacky gum, which was triturated with 20 milliliters of a 10 per cent aqueous solution of sodium hydroxide. The insoluble portion of the sodium salt thus formed was filtered and the filtrate saved. The insoluble salt was then dissolved in hot water containing sufficient alcohol to complete solution. Acidification yielded 90 milligrams of the desired 1-ethyl-2-methyl-2-carboxy-7-methoxy-1,2,3,4,9,10,11,12-octahydrophenanthrene, melting at 183–185 degrees centigrade. Recrystallization from alcohol gave chunky prisms melting at 188–190 degrees centigrade.

Anal. Calc. for $C_{19}H_{26}O_3$: C, 75.6; H, 8.67. Found: C, 75.6; H, 8.76.

The filtrate, which had been saved above, was acidified to give 100 miligrams of acid melting at 60–65 degrees centigrade. Trituration with a 50 per cent methanol-water mixture freed this residue of a higher melting material (228 degrees centigrade), which corresponds by melting point to the known dehydrogenation product (M. P. 226–228 degrees centigrade). The alcohol-water solution deposited silky needles upon standing at ice temperature overnight (M. P. 112–115 degrees centigrade). Recrystallization raised the melting point to 113–115 degrees centigrade.

Anal. Calc. for $C_{19}H_{26}O_3$: C, 75.6; H, 8.67. Found: C, 75.04; H, 8.44.

These two forms are the racemic trans-trans modifications of the acid 1-ethyl-2-methyl-2-carboxy - 7 - methoxy - 1,2,3,4,9,10,11,12-octahydrophenanthrene.

EXAMPLE 10

*1,2-diethyl-2-carboxy-7-ethoxy-1,2,3,4,9,10-hexahydrophenanthrene*

An equivalent amount (0.0255 mole) of triphenylmethyl sodium is added to an ether solution of 0.0255 mole of 1-ethyl-2-carbobenzoxy-7-ethoxy-1,2,3,4,9,10-hexahydrophenanthrene dissolved in 300 milliliters of sodium-dried ether contained in a 500-milliliter glass-stoppered flask. All operations are carried out under an atmosphere of dry nitrogen.

The colored solution which results is allowed to stand at room temperature with occasional shaking for a period of about one hour, after which time the color is substantially faded out. Upon addition of 25 milliliters of ethyl iodide to the mixture, a reflux soon develops, and a precipitate of sodium iodide is formed. After standing overnight, the ether is removed and the residue, 1,2-diethyl-2-carbobenzoxy - 7 - ethoxy - 1,2,3,4,9,10-hexahydrophenanthrene, is refluxed for about 7–9 hours with ten grams of potassium hydroxide dissolved in a mixture of ten milliliters of water and 200 milliliters of 95 per cent ethanol. The alcohol is removed under vacuum on a steam bath and the residue diluted with water, the potassium salt being insoluble in water at ordinary room temperature. Filtration gives a mixture of triphenylmethane and the salt, which after several washings with ether to remove the triphenylmethane, and leaves the white crystalline salt. This salt is dissolved in boiling water, containing sufficient alcohol to effect solution, and acidified while hot with hydrochloric acid to yield the desired 1,2-diethyl - 2 - carboxy - 7 - ethoxy - 1,2,3,4,9,10-hexahydrophenanthrene.

EXAMPLE 11

*1-methyl-2-ethyl-2-carboxy-7-benzyloxy-1,2,3,4,9,10-hexahydrophenanthrene*

An equivalent amount (0.0255 mole) of triphenylmethyl sodium is added to an ether solution of 0.0255 mole of 1-methyl-2-carboethoxy-7-benzyloxy-1,2,3,4,9,10-hexahydrophenanthrene dissolved in 300 milliliters of sodium-dried ether contained in a 500-milliliter glass-stoppered flask. All operations are carried out under an atmosphere of dry nitrogen.

The colored solution which results is allowed to stand at room temperature with occasional shaking for a period of about one hour, after which time the color is substantially faded out. When 25 milliliters of ethyl iodide is added to the mixture, a reflux soon develops, and a considerable precipitate of sodium iodide forms. After standing overnight, the ether is removed and the residue, 1 - methyl - 2 - ethyl - 2 - carboethoxy-7-benzyloxy-1,2,3,4,9,10-hexahydrophenanthrene, is refluxed for about 7 hours with ten grams of potassium hydroxide dissolved in a mixture of ten milliliters of water and 20 milliliters of 95 per cent ethanol. The alcohol is removed under vacuum on a steam bath and the residue diluted with water, the potassium salt being insoluble in water at ordinary room temperature. Filtration gives a mixture of triphenylmethane and the salt, which after several washings with ether to remove the triphenylmethane, leaves the white crystalline salt, which is then dissolved in boiling water, containing sufficient alcohol to effect solution, and acidified while hot with hydrochloric acid to yield the desired product, 1-methyl - 2 - ethyl - 2 - carboxy - 7 - benzyloxy - 1,2,3,-4,9,10-hexahydrophenanthrene.

EXAMPLE 12

*Methyl 1 - isopropyl - 2 - methyl - 7 - methoxy-1,2,3,4,9,10 - hexahydrophenanthryl - 2 - carboxylate*

Two grams (0.0067 mole) of 1-keto-2-methyl-2-carbomethoxy-7-methoxy-1,2,3,4,9,10 - hexahydrophenanthrene was dissolved in dry ethyl ether, and a titrated equivalent of isopropyl magnesium bromide in benzene was added thereto at about room temperature. The reaction mixture was stirred for three to four minutes, during which time considerable heat was evolved. A precipitate separated from the reaction mixture immediately, and this product was worked up with concentrated hydrochloric acid and water. The ether-benzene layer was separated, dried, and the solvent removed to yield an oil product, which, after treatment with methanol, yields the pure methyl 1-isopropylidene-2-methyl - 7 - methoxy-1,2,3,4,9,10-hexahydrophenanthryl - 2 - carboxylate, which in turn is hydrogenated with one equivalent of hydrogen and a palladinized charcoal catalyst to the methyl 1-isopropyl-2-methyl-7-methoxy-1,2,3,4,9,10- hexahydrophenanthrene-2-carboxylate.

Various modifications may be made in the invention without departing from the spirit or scope thereof, and it is to be understood that I limit myself only as defined in the appended claims.

I claim:

1. In a process for the manufacture of a hydroxy-hexahydrophenanthrene - carboxylic acid and derivatives thereof which, upon hydrolysis, are convertible thereto, the step of hydrogenating, at a temperature between about zero and about sixty degrees centigrade, with substantially one mole of hydrogen and a hydrogenation catalyst comprising palladinized charcoal, a hexahydrophenanthrene which is saturated at the 1,2,3,4,9, and 10 positions and which contains, as sole substituents, (a) a lower alkyl group in the 2-position; (b) an esterified carboxy group in the 2-position, said esterified carboxy group having the formula COOR', wherein R' is the residue of an organic alcohol containing up to seven carbon atoms, inclusive; (c) an etherified phenolic hydroxyl group, which contains in the etherifying radical from one to seven carbon atoms, inclusive, in the 7-position; and (d) in the 1-position a lower alkylidene radical, to saturate the double bond of the lower alkylidene group in the 1-position and convert said lower alkylidene group to a lower alkyl group, without saturation of the double bond which is present in the 11,12-position of the hexahydrophenanthrene nucleus.

2. The method of claim 1, wherein the hydrogenation is conducted at a temperature between about thirty degrees and about forty degrees centigrade.

3. In a process for the manufacture of a hydroxy-hexahydrophenanthrene - carboxylic acid and derivatives thereof, which, upon hydrolysis, are convertible thereinto, the steps of hydrogenating with a hydrogenation catalyst comprising palladinized charcoal and with substantially one mole of hydrogen, the reaction being conducted at a temperature between about zero degrees and about sixty degrees centigrade, the 1-alkylidene double bond of a hexahydrophenanthrene compound which is saturated at the 1,2,3,4,9 and 10-positions, and which contains, as sole substituents besides the alkylidene group in the 1-position, a lower alkyl group in the 2-position, an esterified carboxy group in the 2-position, said esterified carboxy group having the formula COOR', wherein R' is the residue of an organic alcohol containing up to seven carbon atoms, inclusive, an etherified phenolic hydroxyl group, which contains in the etherifying radical from one to seven carbon atoms, inclusive, in the 7 position, to saturate the double bond of the alkylidene group in the 1-position, said alkylidene group being a lower alkylidene group, and to convert this group to a lower alkyl group without saturation of the double bond in the 11,12-position of the hexahydrophenanthrene nucleus, and saponifying the esterified carboxyl group of the compound thus produced.

4. In a process for the manufacture of a hydroxy-hexahydrophenanthrene - carboxylic acid and derivatives thereof, which, upon hydrolysis, are convertible thereinto, the steps of hydrogenating with a hydrogenation catalyst comprising palladinized charcoal and with substantially one mole of hydrogen, the reaction being conducted at a temperature between about zero degrees and about sixty degrees centigrade, the 1-alkylidene double bond of a hexahydrophenanthrene compound which is saturated at the 1,2,3,4,9 and 10-positions, and which contains as sole substituents besides a lower alkylidene group in the 1-position, a lower alkyl group in the 2-position, an esterified carboxy group in the 2-position, said esterified carboxy group having the formula COOR', wherein R' is the residue of an organic alcohol containing up to seven carbon atoms, inclusive, and an etherified phenolic hydroxyl group, which contains in the etherifying radical from one to seven carbon atoms, inclusive, in the 7-position, to saturate the double bond of the lower alkylidene group in the 1-position and to convert this group to a lower alkyl group without saturation of the double bond in the 11,12-position of the hexahydrophenanthrene nucleus, saponifying the esterified carboxyl group of the compound thus produced, and neutralizing with mineral acid to produce a 1,2-di-lower-alkyl-2- carboxy-7-etherified-hydroxy- 1,2,3,4,9,10 - hexahydrophenanthrene.

References Cited in the file of this patent

UNITED STATES PATENTS

| Number | Name | Date |
|---|---|---|
| 2,429,166 | Miescher et al. | Oct. 14, 1947 |
| 2,459,834 | Miescher et al. | Jan. 25, 1949 |
| 2,621,210 | Miescher et al. | Dec. 9, 1952 |

FOREIGN PATENTS

| Number | Country | Date |
|---|---|---|
| 250,806 | Switzerland | Sept. 15, 1947 |

OTHER REFERENCES

Bachman et al.: J. A. C. S., vol. 64, pages 974–981 (1942).

Breitner: Chem. Zentr., vol. 114, pages 2688–2689 (1943).

Miescher: Helv. Chim. Acta, vol. 27, pages 1727–1735 (1944).

Heer: Helv. Chim. Acta, vol. 28, pages 991–992 (1945).

Heer et al.: Helv. Chim. Acta, vol. 28, pages 1506–1512 (1945).

Hunter et al.: J. A. C. S., vol. 68, pages 1676–1677 (1946).

Anner et al.: Helvetica Chemica Acta., vol. 29, pages 1889–1895 (1946).

Karrer: "Org. Chem." (1946), 2nd Eng. Ed., 93–102, 196.

Fieser et al.: "Org. Chem." (1950), 2nd Ed., 277–90.